United States Patent Office 3,775,543
Patented Nov. 27, 1973

3,775,543
METHOD OF PRODUCING LOW SODIUM
GROUND MEAT PRODUCTS
Thadeus B. Zyss, Highland, Calif., assignor of a fractional part interest to Milo Don Appleman, Jr., Los Angeles, Calif.
No Drawing. Continuation-in-part of abandoned application Ser. No. 869,370, Oct. 24, 1969. This application Oct. 7, 1971, Ser. No. 187,550
Int. Cl. A22c 11/00, 18/00
U.S. Cl. 426—371
11 Claims

ABSTRACT OF THE DISCLOSURE

A method for producing low sodium, processed meat product in which the improvement comprises employing, as the binding agent, a non-toxic, water soluble potassium phosphate composition in an amount from about 0.2 to 2.0 percent by weight based on the total weight of the ingredient mix in the processed meat products. The potassium phosphate composition is selected from the group consisting of orthophosphate, polyphosphate and pyrophosphate salts of potassium and mixtures thereof.

CROSS REFERENCE TO RELATED APPLICATION

This application is a continuation-in-part of U.S. patent application No. 869,370 filed on Oct. 24, 1969 and entitled "Salt-Free Process Meats and Method for Making Same," now abandoned.

BACKGROUND OF THE INVENTION

This invention relates to processed meat products and, more particularly, to the production of low sodium, processed meat products.

As used herein, the term "processed meat products" or "processed meats" designates the class of meats which are exemplified by bolognas, salami, frankfurters, liverwurst, pork and polish sausage, and meat rolls and loaves. Processed meats are presently prepared by blending and mixing ground meats with various ingredients such as binding agents, nitrite and nitrate color fixing agents, water and taste additives to produce a fairly homogenous product which is usually stuffed into casings and cooked or smoked. The cooked product is relatively homogenous. The component parts are strongly bonded together and the water is substantially evenly dispersed throughout the processed meat, so that the meat product retains its integrity even when cut into thin slices.

The stability of presently-available processed meats is thought to be primarily due to the use of sodium-containing binding agents, e.g., sodium chloride and sodium phosphate, in the processing of these meats. Although most people can readily ingest these processed meats, there is a substantial minority who are unable to do so because of their sodium content. Such persons, e.g., persons suffering from congestive heart failure, must restrict their diet to low sodium foods. These persons have relatively little variety in their diet because of the small number of such foods. Additionally, other people who could benefit from a low sodium diet, but who do not suffer severly from sodium-containing foods, usually do not stay on a prescribed diet because of the poor selection of low sodium foods. Thus, the production of low sodium, processed meats would alleviate the problems of these groups of people in staying on and enjoying a low sodium diet.

PRIOR ART

Although there have been attempts to make low-sodium, processed meats by the use of gelatin to hold the meat together, the resulting product has not been aesthetically pleasing or pleasing to the taste and, therefore, has not been successfully marketed. Also, attempts to make low sodium, processed meats with no binding agent have achieved only limited success because only a certain type of processed meat (salamis) can be made in this manner.

The joint use of potassium chloride and potassium phosphates in the preparation of dietetic sausages has also been described in the prior art.

In U.S. Pat. No. 3,447,932 (Olson et al., 1969) it is disclosed that potassium polyphosphates and potassium pyrophosphates can be used in conjunction with limited amounts of potassium chloride as a substitute for sodium chloride in the manufacture of dietetic sausage and meat loaf products.

The patentees point out that in the manufacture of sausage products, sodium chloride is generally considered to be an essential ingredient for the reason that such products require a meat protein solubilizing agent (NaCl) so that on cooking, the ground particles have sufficient coherence to provide a product of suitable texture.

Olson et al. note that while potassium chloride also functions as a meat protein solubilizing agent and is not harmful to individuals on a low sodium diet, it is not satisfactory in that concentrations which are capable of providing sufficient meat particle coherence impart a bitter and unpalatable taste to these products.

The patentees found that potassium salts of polyphosphates and pyrophosphates can be cooperatively combined with low concentrations of potassium chloride to solubilize meat proteins and produce sodium salt-free sausage and meat loaf of satisfactory texture and taste.

SUMMARY OF THE INVENTION

In accordance with this invention, it has been discovered that potassium phosphate compositions, which are non-toxic and water soluble, can be used as the sole solubilizing and binding agent in the preparation of low sodium, processed meat products.

The potassium phosphate composition is selected from the group consisting of orthophosphate, polyphosphate and pyrophosphate salts of potassium and mixtures thereof and is used in an amount from about 0.2 to 2.0 percent by weight based on the total weight of the ingredient mix in the processed meat product.

The process of this invention includes the step of adding the potassium phosphate composition to and blending it with the ingredients which will make up the low sodium, processed meat product. Following the blending step, the mixture is stuffed into casings or other containers and cooked or smoked at an elevated temperature in accordance with a predetermined schedule.

The use of potassium phosphates as the sole solubilizing and binding agent produces stable products comparable to processed meats made with sodium phosphate and sodium chloride. Although the use of potassium phosphate causes some loss of taste or blandness in the processed meat (with reference to sodium chloride processed meat), this loss can be substantially reduced by the use of spices and sugars.

DETAILED DESCRIPTION

The method of this invention is directed to the use of potassium phosphates as the sole solubilizing and binding agents in the preparation of low sodium, processed meat products.

The meat constituents employed herein include those found in bolognas, liverwurst, salami, sausage and the like, such as beef, pork, chicken and turkey. The processed meat products may also include, for example, water, spices, sugar and color fixing agents such as nitrites and nitrates.

These processed meats are herein referred to as "low-sodium" or "salt-free" meats because sodium chloride is not employed in their production. These meats may contain some sodium chloride which is naturally present therein. However, such amounts are so small as to easily satisfy the requirements for low sodium foods.

The processed meats produced by the herein-described process include chunk-type products such as turkey or chicken loaves or rolls, emulsion-type products such as bolognas, frankfurters and liverwurst, and products intermediate between the chunk and emulsion products such as salamis.

All percentages used herein are weight percentages and are based upon the weight of the processed meat mixture before it is cooked or smoked. However, the weight of the processed meat mixture before cooking does not include extremely minor amounts (less than about 0.5%) of constituents.

The process of this invention will now be more specifically described. The meat employed herein is usually initially subjected to a size-reducing step such as cutting, chopping or grinding. This is done to reduce the size of the meat pieces to substantially the same size which they have in the processed product. The amount of size reduction depends upon the type of product being produced, i.e., whether chunk or emulsion type. For chunk-type products only minimal cutting need be employed and, in some cases, no size-reducing step is necessary. By comparison, for emulsion-type products, the meat is usually chopped and ground into small particles (using a silent cutter, emulsifier or other equipment).

After the sizing step, if one is used, the meat is fed into a mixer wherein it is mixed with the other constituents, including the herein-described binding agents, that are to be contained in the processed meat product, or in the emulsion type product these are added directly to the silent cutter. One of these constituents is almost always water or ice. Water serves several functions one of which is the reduction of temperature increases of the meat caused by friction during grinding. Meat temperature increases due to friction can adversely affect the meat by changing the appearance and taste of the processed meat products.

Another function of water is to carry the binding agents of this invention into intimate contact with all surfaces of the meat so that optimum binding between meat particles or pieces is produced. Although some binding can occur in the absence of added water (particularly where the meat itself has a high water content), this binding is generally relatively weak and usually results in the processed meat falling apart when used by a consumer. In the case of emulsion-type products, the water is the liquid phase of the emulsion.

The water added to the meat mixture is in addition to the water content of the meat itself and is sometimes referred to herein as "added water." The amount of added water depends upon the natural water content of the meat and upon government regulations which presently limit the amount of added water to 10% added moisture of the finished product, although higher amounts could be used if allowed (e.g., about 15% for poultry and about 20–30% for red meats). In general, the amount of added water will vary from a low of about 0.5% to about 1% up to the government-imposed limit of 10%. The addition of water may be made to the mixer, silent cutter or emulsifier or to the meat prior to its being subjected to a size-reducing step or at both these stages.

The potassium phosphates employed herein include potassium orthophosphates, potassium polyphosphates, potassium pyrophosphates and mixtures thereof in their anhydrous and hydrated forms. The phosphate composition is used in an amount from about 0.2 to 2.0% by weight, preferably in an amount from about 0.4 to 1.25% by weight, based on the total weight of the ingredient mix in the processed meat products.

Specific examples of potassium phosphates which can be used in practicing the invention are as follows:

(I) Potassium orthophosphates:
$KH_2PO_4$
$K_2HPO_4$
$K_3PO_4$
$K_2AlPO_4$ (under orthophosphates for classification)
(II) Potassium polyphophates: $K_5P_3O_{10}$
(III) Potassium pyrophosphates: $K_4P_2O_7$ Although the chemistry of phosphates is fairly complex, many water-soluble phosphates are well-known. See, for example, the section on phosphates starting at page 232, vol. 15, of the Encyclopedia of Chemical Technology, 2nd ed., Kirk and Othmer.

In any particular phosphate formulation, there may be a number of different phosphate molecules, depending upon the degree of hydration of the molecule, the degree of alkalinity of the solution in which the phosphate salt is prepared and the temperature of the phosphate solution.

The amount of potassium phosphates required to provide good binding is proportional to the amount of water retained by the processed meat product, i.e., to the amount of water in the meat mixture after cooking. This retained amount of water is usually proportional to the amount of added water. However, for weiner-type products (about 1 in. in diameter as compared with bologna-type products of about 4 in. in diameter), there is a substantial decrease in water content after smoking so that the amount of added water may bear little relation to the amount of such water retained by the processed meat product. Thus, too much water to permit good binding may be included in meat mixtures for weiner-type products before smoking, since smoking can reduce the excess amount of moisture to an acceptable level.

Generally, at a given water level, the more phosphate that is used, the better is the binding that results. Also, the quality of the binding improves with increasing alkalinity of the phosphate. However, the amount of phosphate employed herein (within the aforementioned range) is preferably low (for economic and taste reasons) when the amount of added water is low although the amount of phosphate is raised when the amount of added water is increased. For example, when making a processed poultry product, it was found that at a phosphate level of 0.5%, a fair bind was produced at an added water level of 6% but that an excellent bind was produced at an added water level of only 1%. With this same processed poultry product, a good bind was produced at the 10% added water level by increasing the amount of phosphate to 1%.

The amount of phosphate normally required can be decreased by providing the meat mixture with an alkaline pH. However, an alkaline pH is preferably avoided since it decreases the shelf life of the processed meat as will be further explained hereafter.

As aforementioned, various other constituents which are well-known in the meat processing industry may be included in the meat mixture. Sugars may be employed in an amount from about 0.1 to 3.0% by weight to alter the taste of the processed meats and to act as reducing agents during curing of the meats. For example, dextrose, corn syrup solids and sucrose may be employed. Other constituents that emphasize "meaty" tastes such as potassium glutamate or color fixing components such as potassium nitrite or nitrate may be included in the processed meat.

The pH of the meat mixture in the mixer is adjusted to most facilitate binding consistent with allowing the processed meat a long shelf life. In general, an alkaline pH improves the binding of the meat whereas an acid pH permits longer shelf lives. Thus, if a meat product is to be consumed within a few days of making it, an alkaline pH can be employed. However, since most processed meats are not consumed within a few days, it is preferable to employ an acid pH and, particularly, to employ a pH between about 6.4 to 6.8.

Adjustment of the pH to the desired level may be accomplished by using acids or bases such as citric acid and potassium hydroxide, respectively. Or it may be accomplished by suitable selection of the phosphates when the latter are employer. For example, potassium aluminum orthophosphate, which is highly acidic, may be combined with tetrapotassium pyrophosphate, which is highly basic, in weight ratios between about 1:3 and 1:1, respectively, to produce a pH within the above-mentioned range.

The resulting mixture is preferably mixed until it is relatively homogenous. It is then cooked or smoked to kill various bacteria such as salmonella and to speed up color-fixing if the meat is red meat. By way of example, cooking is usually conducted in an environment at a temperature sufficient to produce an interior meat temperature of about 150° F. in a few hours. Following the cooking or smoking step, it will be noted that the processed meat has shrunk somewhat primarily from water losses and that the meat is strongly bonded together (when phosphates are employed) and the water is relatively uniformly dispersed throughout the product.

This invention will be further described by the following examples.

EXAMPLE I

This example illustrates the use of dipotassium hydrogen phosphate in the production of a poultry roll.

Turkey roll (cooked)

28 lb. of turkey
8 oz. of $K_2HPO_4$
6 oz. of pepper
2 oz. of dextrose
0.25 oz. of $KNO_3$
0.125 oz. of $KNO_2$ The above-processed poultry product was made by first mixing the large chunks of the respective deboned meats in a mechanical mixer with the addition thereto of the other identified ingredients. The resulting mixtures were stuffed into casings to produce approximately nine-pound rolls. The cooked rolls were prepared by cooking the rolls until the internal temperature of the rolls reached 160° F. The smoked rolls were prepared by smoking at a temperature of 140° F. for one hour, at 160° F. for two hours, and at 180° F. for four hours.

In each case, the product rolls were firmly bound so that they could be handled and sliced and still retain their integrity.

EXAMPLE II

A bologna product was prepared from a mixture which had the following composition:

91 lb. of chicken
6 lb. of ice
1.0 lb. of dextrose
1.0 lb. of spice
15 oz. of tripotassium orthophosphate ($K_3PO_4 \cdot 3H_2O$)
0.25 oz. of potassium nitrate
0.12 oz. of potassium nitrite The meat was ground and chopped with the addition of spices, dextrose, tripotassium orthophosphate, potassium nitrate, potassium nitrite and ice, emulsified, stuffed into large casings or molds and then smoked or cooked until an internal temperature of 155° F. was reached. The emulsified product exhibited good binding.

EXAMPLE III

This example illustrates the use of two different phosphates which, in combination, provide the processed meat with a slightly acid pH. A turkey roll was prepared with the following composition:

97 lb. turkey
1.5 lb. water
3.2 oz. potassium aluminum orthophosphate
12.8 oz. tetrapotassium pyrophosphate ($K_4P_2O_7$)·$3H_2O$
6 oz. pepper
2 oz. dextrose The pH of this mixture was about 6.5. The mixture was cooked at 180° F. for six hours. The resulting turkey roll was strongly bound.

EXAMPLE IV

In this example tripotassium pyrophosphate was used as the binding agent. A meat mixture was made up as follows:

50.5 lb. beef
42.0 lb. pork
4.0 lb. water
1.0 lb. tripotassium pyrophosphate ($K_3HP_2O_7 \cdot 3H_2O$)
1.5 lb. dextrose
1.0 lb. spices
0.25 oz. $KNO_3$
0.125 oz. $KNO_2$ The pH of the above mixture was 6.4. This mixture was cooked at 180° F. for six hours. At the end of this time, it was noted that a good ground meat mixture was produced with the water being evenly dispersed throughout the product.

EXAMPLE V

This example illustrates the use of potassium tripolyphosphate as the binding agent.

A salami was made by first coarsely grinding 50 lb. beef and 42 lb. pork. The ground meat was then well mixed with:

45 lb. of water
1 lb. of potassium tripolyphosphate ($K_5P_3O_{10}$)
1.5 lb. of dextrose
6 oz. of ground pepper
1 oz. of nutmeg
1 oz. of coriander
2 oz. of paprika
6 oz. of whole black pepper
0.25 oz. of $KNO_3$
0.125 oz. of $KNO_2$ This mixture was stuffed into casings and cooked until an internal temperature of 155° F. was reached. The cooked salami product exhibited good bind and the uniformity was excellent.

EXAMPLE VI

This example employed 1.0 lb. of potassium pyrophosphate, $K_3HP_2O_7 \cdot 3H_2O$ in place of 1.0 lb. of potassium tripolyphosphate as in Example V. Conditions and results of processing were otherwise the same as in Example V.

EXAMPLE VII

This example employed 1.0 lb. of another potassium pyrophosphate, $K_4P_2O_7 \cdot 3H_2O$, in place of 1.0 lb. of potassium tripolyphosphate of Example V. Conditions and results of processing were otherwise the same as in Example V.

Having thus provided a written description of the invention, it should be understood that no undue limitations are to be imposed by reason of the specific examples, but that the present invention is defined by the appended claims.

I claim:

1. In a method of producing low sodium, dietetic ground meat products, the improvement which consists of employing, as the sole solubilizing and binding agent, a non-toxic, water soluble, potassium phosphate composition selected from the group consisting of orthophosphate, polyphosphate, and pyrophosphate salts of potassium and mixtures thereof in an amount from about 0.2 to 2.0 percent by weight, based on the total weight of the ingredient mix in the ground meat products.

2. The method of claim 1 wherein the potassium phosphate composition is present in amount from about 0.4 to 1.25 percent by weight.

3. The method of claim 1 wherein the potassium phosphate composition is anhydrous monopotassium orthophosphate.

4. The method of claim 1 wherein the potassium phosphate composition is anhydrous dipotassium orthophosphate.

5. The method of claim 1 wherein the potassium phosphate composition is anhydrous tripotassium orthophosphate.

6. The method of claim 1 wherein the potassium phosphate composition is hydrated monopotassium orthophosphate.

7. The method of claim 1 wherein the potassium phosphate composition is hydrated dipotassium orthophosphate.

8. The method of claim 1 wherein the potassium phosphate composition is hydrated tripotassium orthophosphate.

9. The method of claim 1 wherein the potassium phosphate composition is potassium tripolyphosphate.

10. The method of claim 1 wherein the potassium phosphate composition is tetrapotassium pyrophosphate.

11. The method of claim 1 wherein the potassium phosphate composition is tripotassium pyrophosphate.

References Cited

UNITED STATES PATENTS

| | | | |
|---|---|---|---|
| 2,513,094 | 6/1950 | Hall | 99—159 |
| 3,029,150 | 4/1962 | Bickel | 99—159 X |
| 3,104,170 | 9/1963 | Mahon | 99—107 |
| 3,447,932 | 6/1969 | Olson et al. | 99—108 |
| 3,573,062 | 3/1971 | Paynter et al. | 99—107 |

OTHER REFERENCES

Rose et al., "The Condensed Chemical Dictionary," 1956, 5th ed., published by Reinhold Publishing Corp., New York, p. 896, Potassium Metaphosphate.

HYMAN LORD, Primary Examiner

U.S. Cl. X.R.

99—107, 109, 159